United States Patent [19]
Diefes et al.

[11] Patent Number: 5,446,465
[45] Date of Patent: Aug. 29, 1995

[54] SATELLITE LOCATION AND POINTING SYSTEM FOR USE WITH GLOBAL POSITIONING SYSTEM

[76] Inventors: Debra L. Diefes, 7481 Digby Green, Alexandria, Va. 22310; Leopold C. Fan, 10037 Colebrook Ave., Potomac, Md. 20854; Charles E. Rodgers, 3635 St. Leonard Rd., St. Leonard, Md. 20685

[21] Appl. No.: 83,267

[22] Filed: Jun. 29, 1993

Related U.S. Application Data

[63] Continuation-in-part of Ser. No. 77,734, Jun. 18, 1993.

[51] Int. Cl.$^6$ .......................... H04B 7/185; G01S 5/02
[52] U.S. Cl. .................................... 342/357; 342/352
[58] Field of Search ............... 342/357, 359, 352, 419; 455/12.1

[56] References Cited

U.S. PATENT DOCUMENTS 5,296,862 3/1994 Rodeffer et al. .................... 342/359

OTHER PUBLICATIONS

Brown et al., "Interferometric Attitude Determination Using the Global Positioning System", Proceedings of 3rd Int'l Geodetic Symposium on Satellite Doppler Processing, vol. 2, Feb. 1982, pp. 1289–1302.
Lucus et al., "Attitude Determination with GPS", ION Satellite Div. Tech Meeting, Sep. 1988, pp. 85–88.
Kruczynski et al., "Using GPS to Determine Vehicle Attitude", ION Satellite Div. Tech Meeting, Sep. 1988, pp. 140–145.
R. Lucus et al., "Attitude Determination with GPS", ION GPS, Sep. 1988.
Nesbo, ION GPS "Applications of GPS Determined Attitude for Navigation", Sep. 1988.
Rath et al., "Attitude Estimation Using GPS", ION National Tech Meeting, Jan. 1989, pp. 169–178.
Kruczynski et al., ION GPS "Using GPS to Determine Vehicle Attitude USS Yorktown Test Results", 163–171.
Wells et al. "GPS: A Multipurpose System", GPS World, Jan. 1990, pp. 60–63.
Evans et al., "Platform Attitude Determination by the Use of GPS-Activities at the Naval Surface Warfare Center", ION 46th Annual Meeting, Jun. 1990, pp. 3–8.
Nesbo et al., "GPS Attitude Determination for Navigation", GPS World, Oct. 1990, pp. 37–41.
Keirleber et al., "Attitude Determination for Space Transfer Vehicles Using GPS", ION National Tech Meeting, Jan. 1991, pp. 85–101.
Ferguson et al., "Three-Dimensional Attitude Determination with the Ashtech 3DF 24-Channel GPS Measurement System", ION National Tech Meeting, Jan. 1991, pp. 35–40.
Cohen et al., "Expanding the Performance Envelope of GPS-Based Attitude Determination", Sep. 191, pp. 1001–1010.
Mercer et al., "United States Navy Applications of a GPS Attitude and Position Measurement System", Sep. 1992, pp. 783–791.
Cohen et al., "Aircraft Applications of GPS-Based Attitude Determination ", Sep. 1992, pp. 775–782.
Cannon et al., "Real-Time Heading Determination (List continued on next page.)

*Primary Examiner*—Theodore M. Blum
*Attorney, Agent, or Firm*—Collier, Shannon, Rill & Scott

[57] ABSTRACT

A system for determining location and pointing angle to a selected one of a first series of orbiting satellites as provided, wherein information relating to the system and desired satellite, is provided the electronic signals emitted by a second series of orbiting satellites. System is hand-held, compact, and portable, and is adapted to work in any environment, being immune to magnetic deviations. The satellite locating and pointing system makes use of certain hardware configurations and mathematical algorithms to determine location, and elevation information with respect to both the user and the desired satellite. The mathematical algorithms are also adapted to reduce errors inherent in incoming information from said satellites.

25 Claims, 5 Drawing Sheets

OTHER PUBLICATIONS

Using an Integrated GPS-Dead Reckoning System", Proceedings of ION GPS, Sep. 1992, pp. 767–773.

Cohen et al., "Two Studies of High Performance Attitude Determination Using GPS: Generalizing Wahba's Problem for High Output Rates and Evaluation of Static Accuracy Using a Theodolite", ION GPS, Sep. 1992, pp. 1197–1201.

Martin-Neira et al., "GPS Attitude Determination of Spin Stabilized Satellites", ION GPS, Sep. 1992, pp. 757–765.

Weinman et al., "Attitude Error Estimation with an Offset GPS Antenna: Concept Validation Testing" ION GPS, Sep. 1992, pp. 747–755.

Schwartz et al., "Testing a GPS Attitude System in Kinematic Mode", ION GPS, Sep. 1992, pp. 801–809.

Lu et al., "Attitude Determination in a Survey Launch Using Multi-Antenna GPS Technology", ION National Tech Meeting, Jan. 1993, pp. 251–259.

Cohen et a., "Flight Tests of Attitude Determination Using GPS Compared Against an Inertial Measurement Unit", ION National Tech Meeting, Jan. 1993, pp. 579–587.

Martin-Neira et al., "Using GPS to Determine the Attitude of a Spacecraft", GPS World, Mar. 1993, pp. 49–66.

Laser Atlanta, Mapping and Surveying Products, Pro-Survey 1000® Laser Rangefinder.

SATELLITE LOCATION AND POINTING SYSTEM FOR USE WITH GLOBAL POSITIONING SYSTEM

GOVERNMENT RIGHTS

This invention was made with Government support under Contract No. DAAB07-93-C-A507 awarded by the United States Department of Defense, U.S. Army. The Government has certain rights in this invention.

RELATED APPLICATION

This application is a continuation-in-part of U.S. patent application Ser. No. 08/077,734, filed on Jun. 18, 1993 by applicants and entitled "Attitude Determining System For Use With Global Positioning System," incorporated herein by reference.

FIELD OF THE INVENTION

This invention relates generally to a novel satellite location and pointing system for use with the Global Positioning System ("GPS"). The invention more particularly relates to a satellite location and pointing system for determining the pointing angle to a selected satellite of a series of earth-orbiting satellites. In its most precise embodiment, the satellite location and pointing system receives GPS satellite signals and determines the system's location, calculates the pointing angle to a selected earth-orbiting satellite, and then guides the user to the proper pointing angle by, for example, audio signals and a visual display.

BACKGROUND OF THE INVENTION

The Global Positioning System ("GPS") was conceived, developed, and deployed by the United States Department of Defense over ten years ago. The GPS' purpose was to provide air, ground, and naval users with precise position and time information. Although principally conceived for military purposes, the GPS also includes a band of signals designated for non-military use. These non-military signals may be used advantageously in numerous private and commercial applications. For example, the GPS can be used by commercial airlines and private pilots, to accurately and quickly ascertain their location. Similarly, both commercial shippers and private boatmen can use the GPS at any time to accurately determine their position, without the need for conventional points of reference, such as the magnetic poles.

The GPS is a series of twenty-four satellites orbiting the earth. The satellites are deployed in twelve hour orbits and are dispersed in six orbital planes. These satellites continuously emit electronic signals—telemetry—which are received by ground-based or other terrestrial receivers. By simply receiving the signal from four or more orbiting GPS satellites, a properly configured receiver can accurately determine the position of a vehicle carrying the receiver, the vehicle's velocity, the GPS satellite's position, and the time. In addition, technology has been developed to determine information relating to the attitude, direction of travel, pitch, and roll of a vehicle carrying the receiver from the GPS signals. This technology is fully disclosed in applicant's co-pending U.S. application Ser. No. 08/077,734 entitled "Attitude Determining System For Use With Global Positioning System", the disclosure of which is incorporated herein by reference. The Attitude Determining System ("ADS") provides heading and navigation information to naval, air borne, or ground-based vehicles.

The GPS ADS uses carrier-phase interferometry of the GPS signals to measure the signal arrival time difference at two or three closely separated antennas. Carrier phase interferometry refers to measuring the difference in the time that is takes a satellite signal to be received by two or more antenna spaced a known distance apart. By using the GPS satellite signal arrival time differences, it is possible to determine which antenna is closest to each satellite. This arrival time difference can be used to calculate an angle between each GPS satellite and a baseline formed by each antennae pair. These angles, combined with the position of each satellite and of the ADS system to calculate the baseline attitude. The calculations are performed using an algorithm developed by applicant and disclosed in the aforementioned U.S. application Ser. No. 08/077,734.

The GPS has tremendous benefits over other positioning systems, such as gyroscopes, magnetic compasses, and theodolites, in that it relies upon no visual, magnetic, or other point of reference. These advantages are particularly important in applications such as aviation and naval navigation which traverse polar regions where conventional magnetic navigational means are rendered less effective by local magnetic conditions. Moreover, there is no signal degradation, or loss of quality of positioning information at higher latitudes. Magnetic deviations and anomalies common in standard positioning systems do not exist. In addition, the GPS is typically fabricated of standard, solid state electronic hardware, resulting in a low cost, low maintenance system, having few or no moving parts, and requiring no optics. The GPS does not have the calibration, alignment, and maintenance requirements of conventional inertial measuring units. Also, the GPS is available twenty-four hours a day on a worldwide basis. Further, normal GPS operation provides positioning with accuracies of about 100 meters for non-military uses. Military users can make use of encryption keys which yield position information within 10 meters.

Notwithstanding these advantages, a need arose for a mobile system capable of determining the location of selected communication satellites at any given time, then determining the pointing angle to a selected earth-orbiting satellite, such as a communications satellite. Prior devices for determining satellite location and position were generally integrated into larger communications systems. So, to determine if satellite communication was possible at a given location, the entire communications system had to be assembled before satellite location was ascertainable. As a consequence, oftentimes personnel invested energy and time in assembling the satellite communications system only to find the communications path to a selected satellite obstructed by, for example, a tree or hilly terrain. Thus, a device capable of quickly ascertaining the precise location and pointing angle to selected orbiting satellites, while eliminating the need to assemble the entire communications system, became desirable.

The subject satellite locating and pointing capability has particular utility for military forces engaged in covert operations in disputed territory, although nonmilitary applications may also be envisioned. Moreover, the development of new technological applications of the GPS was limited by the structural size of prior art communication and navigation devices. Thus, a more compact, portable device capable of interacting with GPS satellites and other earth-orbiting satellites, particularly communications satellites, became desirable.

These deficiencies and other limitations of conventional navigation and satellite location systems are addressed by the invention disclosed herein. These and other objects and advantages of the subject invention will become apparent from a perusal of the Detailed Description of the Invention, the Drawings, and the Claims which follow.

OBJECTS OF THE INVENTION

Accordingly, it is therefore a general object of the invention to provide a satellite location and pointing system for use in conjunction with the GPS which will obviate or minimize difficulties of the type previously described.

It is the specific object of the invention to provide a satellite location and pointing system which calculates and displays satellite visibility windows from stored orbital information on satellites of interest, such as communications satellites, and then guides a user to the correct pointing angle for a desired satellite.

It is still another object of the invention to provide a satellite location and pointing system which is portable and, therefore, has broader applications than prior existing navigation and communication systems.

It is a further object of the invention to provide a satellite location and pointing system which achieves high accuracy for any given antenna separation.

It is yet a further object of the invention to provide a satellite location and pointing system which simplifies twenty-four hour, worldwide satellite communication.

It is still a further object of the invention to provide a satellite location and pointing system which does not suffer from signal degradation at high latitudes and which is not affected by magnetic deviations.

It is yet another object of the invention to provide a satellite location and pointing system which is easily assembled at low cost, is modular for easy replacement of components, requires no calibration, and has no moving parts, thus requiring low maintenance.

It is still yet another object of the invention to provide a satellite location and pointing system which, for military applications, calculates the time and position of a satellite in a universal reference frame used throughout the military, particularly important for command, control, communication, and intelligence.

These and other objects and advantages of the instant invention will become apparent from a perusal of the Detailed Description of the Invention which follows.

SUMMARY OF THE INVENTION

The invention disclosed herein relates to a satellite location and pointing system for use in conjunction with the GPS to locate communication satellites and point a communication satellite dish towards a selected communication satellite. The satellite location and pointing system employs hardware and algorithms for locating a selected satellite and determining the pointing angle to the selected satellite.

The instant invention makes use of an attitude determining system which is based on carrier phase interferometry of GPS signals to measure the signal arrival time difference between two closely separated antennas. Carrier phase interferometry refers to measuring the difference in the time that it takes a satellite signal to be received by two or more antennas spaced a known distance apart. By using the GPS satellite signal time arrival difference, it is possible to measure which antenna is closer to each satellite. This phase difference can be used to calculate an angle between each satellite and the antenna baseline. These angles are combined with the position of each satellite and the attitude determining system to calculate the baseline attitude. Since a global positioning receiver provides the attitude determining system position as well as satellite position, it is possible to convert the satellite's angles into single attitude vector.

The hardware referenced above includes a GPS signal receiving antenna array. In a preferred first embodiment, three antenna are arranged in arranged in an equilateral triangle, the sides of which are approximately 0.20 meters in length. The triangular baseplane provides a three baseline configuration, allowing the attitude determining system to solve for a three dimensional attitude in heading, pitch, and roll. The distance between the antennas is important and should be related to the wavelength of the GPS signal (0.1902 meters). A second preferred embodiment consists of two antennas positioned approximately 0.17 meters apart to form a single baseline. This antenna configuration provides a two-dimensional azimuth measurement of the subject system. In this two-dimensional embodiment, an inclinometer may be used to determine the elevation angle of the system.

A preferred embodiment of the invention includes a system for locating and determining a selected one of the first series of orbiting satellites, by receiving telemetry and other electronic signals provided by a second series of orbiting satellites. This second series of orbiting satellites refers to the global positioning system satellite discussed hereinabove. By using received telemetry and other electronic signals, the satellite locating in positioning system calculates the location and pointing angle of said selected one of said first series of orbiting satellites relative to the location of the system itself. The system itself is a hand-held, portable system, comprising an antenna array means having at least two, and prefereably three, discrete antenna. The antenna array is adapted to receive the telemetry and other electronic signals transmitted by the GPS series of orbiting satellites. The instant invention further comprises a receiver means electronically communicating with each said discrete antenna, and adapted to interpret the telemetry and electronic signals collected by the antenna array. The receiver is then capable of producing an output signal which is then directed to a microprocessor. The microprocessor is employed to embed algorithms relating to the above referenced attitude determining system, and for screening and eliminating errors from telemetry as it is received from the orbiting GPS satellite. The microprocessor also has embedded therein almanac data relating to one or more series of non-GPS satellites, which the user may be interested in accessing. By having this information loaded, it is possible for the microprocessor to access that information, compare it with information being received from said receiver means, and using an algorithm means such as that disclosed with respect to the attitude determining system, calculate the exact location and time that it desired one of said non-GPS satellites will be available.

The algorithmic means calculates the azimuth and elevation of the system itself, as well as the azimuth and elevation of said selected one of the first series of non-GPS satellites. The system may further comprise input and output means for receiving selected input from a user, so that information can be input directly into the microprocessor unit. The output means is, for example, a display such as an active matrix liquid crystal display, which may or may not be touch sensitive, and is adapted for visually displaying information to a user of the system. Displayed information may be either graphic or alphanumeric. The system may further comprise inclinometers for establishing the orientation of the system with respect to the horizon. The inclinometers may be standard poteniometers of the type known in the art. If the inclinometers are analogged, it may be necessary to provide analogged digital converters so that the information being provided by the inclinometer can be received by the central processing unit.

The antenna array discussed hereinabove may be either two or three discrete antenna arranged in a preferred manner. In the event that three antenna are employed, a preferred arrangement is an equilateral triangle wherein the distance between any two of said antennas is approximately 0.2 meters. In the embodiment wherein two antennas are employed, said antennas are arranged in a baseplane a predetermined distance apart from one another. In one embodiment the distance in which they are spaced is approximately 0.2 meters. Regardless of whether the antenna array comprises two or three discrete antennas, they are mounted on a baseplane fabricated of, for example, machined aluminum, and mounted on said baseplane in such a manner as to form a pointing plane. Pointing plane is adapted to assist in pointing the antenna array at the desired satellite.

The system may further comprise an auditory information means, such as a speaker, buzzer. The auditory information means is provided for assisting the user in locating the correct pointing angle between the system and the desired satellite. For example, in one preferred embodiment, the signal emitted by the auditory information means is a low frequency, or low volume signal when the pointing angle to the satellite is great. However, as the pointing angle becomes closer to the selected satellite, the frequency or volume of the auditory information means may increase.

Each of these elements will be discussed and illustrated in greater detail in connection with the Figures and Detailed Description of the Invention presented below.

DETAILED DESCRIPTION OF THE INVENTION

Figure 1:
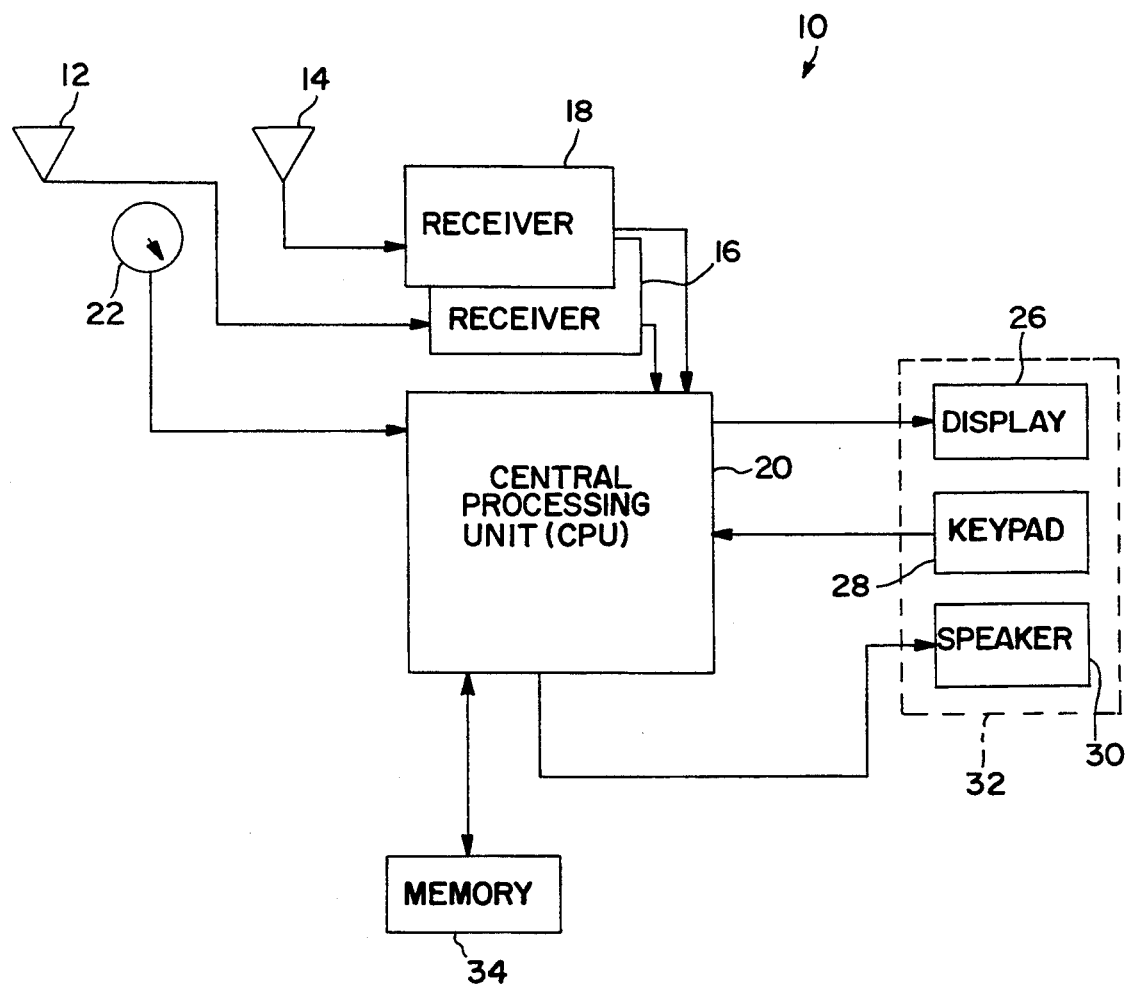
FIG. 1 is a block diagram illustrating the relationship between the elements of the satellite location and pointing system in accordance with a preferred embodiment of the invention.

Referring now to the drawings, where like numerals indicate like parts, and initially to FIG. 1, there will be seen a block diagram of the elements of a preferred embodiment of the inventive satellite location and pointing system. The satellite location and pointing system employs hardware components and an algorithm for determining the pointing angle to a desired earth-orbiting satellite, such as a communications satellite. The satellite location and pointing system stores orbital information on satellites of interest, and then uses that information to calculate and display the windows of time during which the satellites are visible to a user. In a preferred embodiment, the satellite location and pointing system calculates the pointing angle to a selected earth-orbiting satellite and then guides the user to the proper pointing angle by both an audio signal and visual display. The system generally comprises a handheld, portable unit which may be used to locate a desired orbiting satellite rapidly. A user may then point a communications antenna towards the satellite to transmit information to a remote location. This capability is especially valuable to military forces operating with small satellite dishes in disputed territory.

In a preferred embodiment of the invention, the satellite location and pointing system, generally indicated 10, includes an antenna array consisting of at least two antennas 12 and 14, and, in an alternative preferred embodiment, three antennas. The antenna array collects telemetry and other electronic signal information from orbiting Global Positioning System ("GPS") satellites. The antenna array may also include preamplifiers (not shown) to improve the signal-to-noise ratio of incoming information collected from the GPS satellites. Each antenna 12 and 14 preferably consists of a microstrip patch antenna. Alternatively, the antennas may be conventional GPS antennas, such as Ball Communication Systems division model no. AN496C.

The signals received by each antenna 12 and 14 are transmitted to GPS receivers 16 and 18, respectively. Receivers 16 and 18 collect and de-code signal data from antennas 12 and 14, such as carrier phase information, ephemeris data, almanac data, and pseudorange data, to determine the system's position, the time, the GPS satellite's position, and the carrier phase at each antenna. Receivers may comprise Magnavox GPS engine receivers, which are low cost, low weight, and low volume receivers. The standard receiver board size measures 2.6 inches × 6.3 inches × 1 inch and weighs less than 1 pound. The size and weight makes this type of receiver particularly suitable for a portable unit. The number of receivers depends on the configuration of the antenna array, which in turn depends on the pointing angle accuracy requirement. Possible antenna array configurations will be discussed more fully in connection with FIGS. 2a, 2b, and 2c.

Receivers 16 and 18 electrically communicate with a central processing unit 20, relaying collected information for processing. Central processing unit 20 may be an off-the-shelf microprocessor, and, in a preferred embodiment, comprises a single board computer, such as a conventional 386 or 486 microprocessor, equipped with a standard real-time operating system. Microprocessor 20 may be selected from a number of conventional single board processors, such as Computer Dynamics model SBC-20SX, a 20 MHz 386 microprocessor, or model SBC-25SX, which operates at 25 MHz. Alternatively, Win Systems' 20 MHz 386 microprocessor or Ampro's 20 MHz 386 are suitable microprocessors for the subject invention.

Such single board processors may be as small as 4 inches×5 inches×1.5 inches. These microprocessors have clock speeds in the 20 MHz range and can accept up to 4 Mbytes of random access memory. In addition, these single board processors contain enough erasable-programmable, read-only memory 34 to embed satellite location algorithm software and attitude determining system ("ADS") algorithm software on the board. The software components of the subject invention will be discussed below in association with FIGS. 3 and 4. The operating system of microprocessor 20 employs the satellite location algorithm and the ADS algorithm to determine the pointing angle of the baseline extending between each antenna pair and the difference between the current pointing angles and the desired pointing angle. The current pointing angle refers to the angle at which the satellite location and pointing system is directed at any given time. The desired pointing angle is the angle at which the satellite of interest is located. Central processing unit 20 also contains software to perform functions such as data conversions, user interface, memory management, and other conventionally known "housekeeping" functions.

Figure 2A:
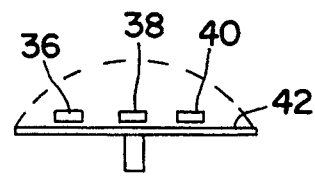
FIGS. 2a and 2b are side and top plan views, respectively, of a first antenna array unit illustrating the relationship of three discrete antenna arranged in a triangular configuration.
Figure 2B:
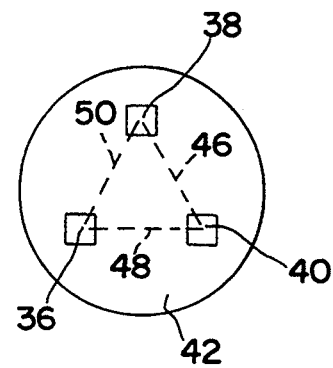
Figure 2C:
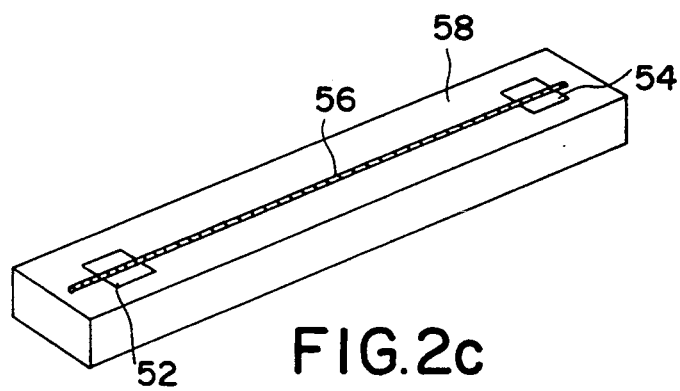
FIG. 2c is a perspective view of a second antenna array unit illustrating the relationship of two discrete antenna arranged in a two-dimensional, single baseline configuration.

In an embodiment employing a two-dimensional antenna configuration, an inclinometer 22 also communicates with central processing unit 20. More specifically, if the antenna array is arranged in a two-dimensional configuration, as shown in FIG. 2c, forming a single baseline for calculating the azimuth measurement, an inclinometer 22 may be used to determine the elevation angle of the baseline. Thus, the inclinometer provides an additional measurement to determine the three-dimensional orientation of the system 10. Where inclinometer 22 consists of an analog device, such as a potentiometer, inclinometer 22 produces an analog signal whose voltage is relative to the elevation. This analog signal is digitized by an analog-to-digital converter 24 and then transmitted to central processing unit 20. Possible inclinometers include the CP17-0601-1 and CP17-1101-1 models manufactured by Humphery, Inc. The first model has approximately a 0.5 degree elevation accuracy and weighs only 6 ounces, whereas the second model has an accuracy level of 0.9 degrees and weighs about 5 ounces. An inclinometer is not necessary where the antenna configuration includes three distinct antennas arranged in a triangular formation, as shown in FIGS. 2a and 2b. In such a case, the three antennas form three baselines which produce enough information to determine azimuth, elevation, and roll measurements.

Central processing unit 20 also electrically communicates with a user-interface, such as display device 26 and keypad 28. It will be understood that the display device 26 may be a touch-sensitive, liquid crystal display designed to allow data and graphics to be displayed to a user. Such a touch-sensitive display would enable a user to request certain information from the processing unit 20 or to enter specific instructions relating to algorithm parameters. The graphics also serve as a visual indicator to guide the operator to the proper satellite pointing angle, as seen in FIG. 6.

In an alternative embodiment, display device 26 may be integrated with an optional keypad 28 and audio indicator 30, such as a speaker, into a detachable unit 32 connected to central processing unit 20 by a coiled cable. Such an embodiment would enable mounting of the antenna array assembly directly to a large satellite dish or tripod, while the user would remain free to maneuver about the mounted antenna array. Key pad 28 preferably has numeric keys for entering algorithm parameters, as well as several function keys. Function keys are feasible because the algorithm software stored in central processing unit 20 may be menu-driven.

Audio indicator 30 may consist of a simple piezoelectric speaker communicating with processing unit 30 through a speaker port, as typically found on a personal computer. In such an embodiment, speaker audibly indicates whether the unit 10 is pointing at the correct pointing angle for a selected satellite. More specifically, the satellite location algorithm stored in central processing unit 20 determines how near the current pointing angle of system 10 is to the desired pointing angle. Central processing unit 20 outputs a digital signal representing the frequency corresponding to difference between the current pointing angle and the desired pointing angle. Audio indicator 30 will emit a sound corresponding to how near the angle orientation of unit 10 is to the desired satellite pointing angle. For example, low frequency sound may represent a larger pointing angle differential than high frequency sound.

The subject satellite location and pointing system also includes a power supply which generally consists of a battery. The power requirements depend on the system's required operation time and on the specific components selected and assembled to form each individual satellite location and pointing system assembly.

Referring now to FIGS. 2a and 2b, there will be seen a side view and top plan view of a first preferred embodiment of antenna array, represented by 12 and 14 in FIG. 1, of the instant invention. This antenna array embodiment consists of three discrete antennas 36, 38, and 40. The antenna array further includes a ground plane 42 having minimal surface area and being generally circular in shape. The discrete antenna 36, 38, and 40 are arranged in the circular ground plane 42 such that they are equi-distant from the edges of the ground plane 42. This arrangement acts to reduce antenna differential phase error. The ground plane 42 is also adapted to reduce multipath error and to minimize antenna phase center error. In this embodiment, the antenna array is fabricated of machined aluminum to ensure a smooth ground plane surface.

In this first embodiment of the instant invention, antennas 36, 38, and 40 are arranged in an equilateral triangle. Linear baselines 46, 48, and 50 extend between each pair of antennas and form the arms of the equilateral triangle. Linear baselines 46, 48, and 50 are preferably approximately 0.20 meters. In this configuration, the 0.20 meter baseline is shorter than the carrier wavelength so that there will be no integer wavelength phase differences between the antennas. In addition, the 0.20 meter baseline minimizes the integer ambiguity problem experienced by longer baselines.

In another embodiment of the instant invention illustrated in FIG. 2c, antennas 52 and 54 are arranged in a single baseline configuration on ground plane 58. Baseline 56 is relatively short, being on the order of approximately 0.17 meters. It will be apparent to one of ordinary skill in the art that other configurations of antennas within the antenna array are possible and may be advantageously applied for a particular application. The antenna array may further include other elements, such as pendulum elements for correcting for pitch and roll of the antenna array when mounted on, for example, a naval vehicle or other mobile vehicle. Alternatively, such elements may be excluded from the array for other applications.

The satellite location and pointing system also includes several mathematical algorithms preferably embedded into central processing unit 20. The algorithms used in conjunction with the hardware of the subject satellite location and pointing system include five general functions, namely, (1) calculating the orbital plane position of a satellite in a chosen constellation, (2) transforming the orbital place coordinates into earth fixed coordinates, (3) calculating the attitude of the antenna baseline to determine location of the system user, (4) calculating the visibility windows and location of selected earth-orbiting satellites, such as communications satellites, and (5) controlling the user interface aspects of the system.

Figure 3:
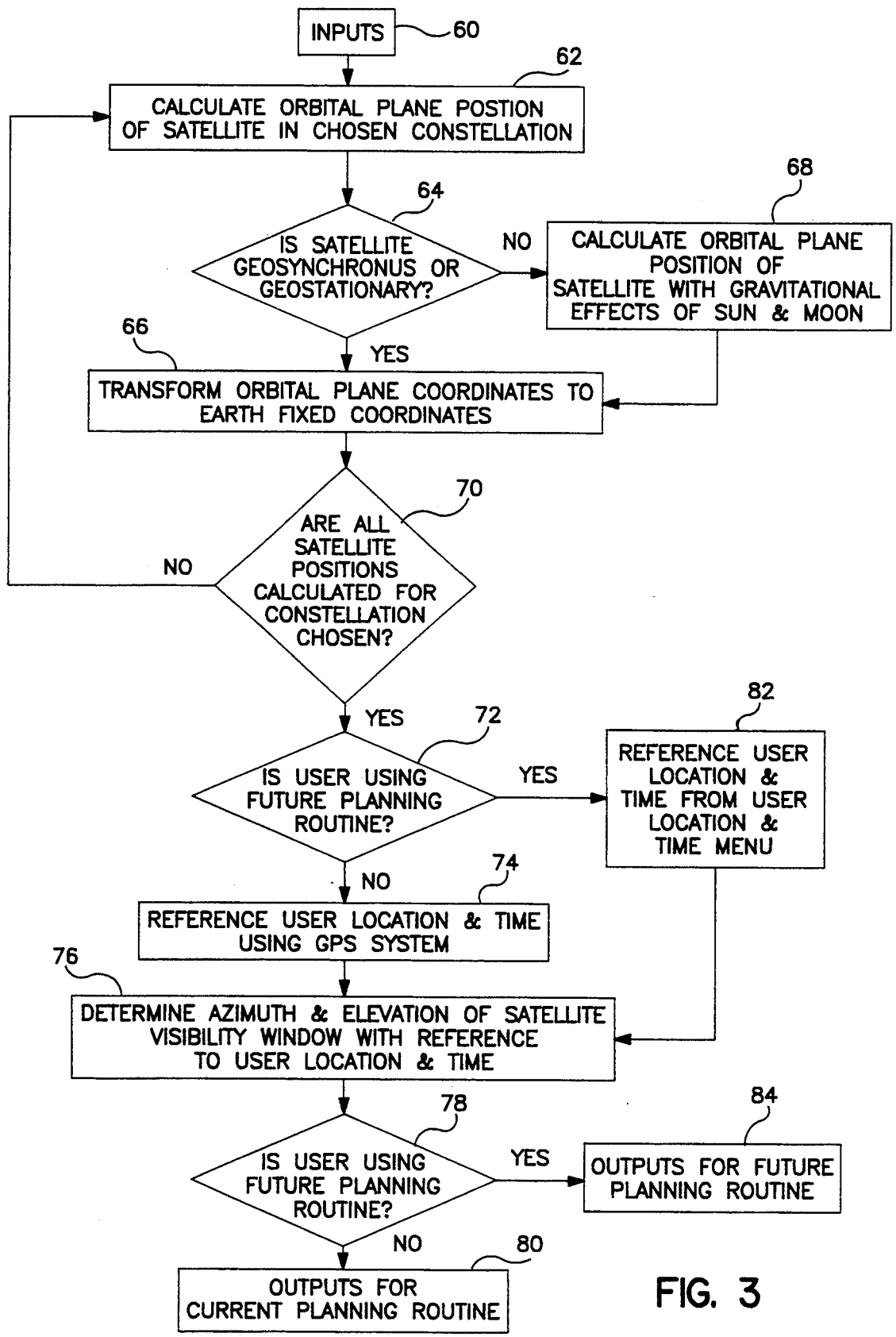
FIG. 3 is a flow diagram illustrating the satellite location algorithm.

Referring to FIG. 3, a flow chart of the satellite location algorithm in accordance with the present invention is shown. In general, the satellite location algorithm enables a user to locate a communications satellite from a chosen satellite constellation from either his current location or a future location and to determine the pointing angle to the selected satellite. This information may then be used by the user to assemble a communications system in the proper orientation for transmitting information from the user to a remote location via the selected satellite. According to the satellite location algorithm of the present invention, a user first inputs information, including a chosen satellite constellation and his location and time, if known, into central processing unit 20 via keypad 28, as indicated by Box 60. Almanac data corresponding to the satellite constellation selected by the user is then retrieved by central processing unit 20 from data stored in memory 34. The orbital plane position of a given satellite in the chosen satellite constellation is then calculated, as shown by Box 62, as follows:

$$x_K' = r_K \cos(u_K)$$

$$y_K' = r_K \sin(u_K)$$

where
  K = refers to the Kepplerian Orbital path;
  $r_K$ = the radius from the earth to the given satellite = $A(1-e \cos EK)$ having variables
    A = semi-major axis,
    e = eccentricity, and
    $E_K$ = the eccentric anomaly = $\cos^{-1}\{(e + \cos v_K)/(1 + e \cos v_K)\}$ where $$v_K = \text{True anomaly} = \tan^{-1} \frac{\sin v_K}{\cos v_K}$$

If the given satellite is either geosynchronous or geostationary, as shown by Box 64, the satellite location algorithm then proceeds to the next step, namely transforming the orbital plane coordinates into earth fixed coordinates, seen in Box 6, as follows:

1. First, the corrected longitude of the ascending node is calculated.

$$\Omega_K = \Omega_o + (\Omega - \Omega_e)t_K - \Omega_c t_{oa}$$

where
  $\Omega_K$ = the corrected longitude of the ascending node;
  $\Omega_o$ = longitude of ascending mode of orbital plane (uncorrected)
  $\Omega_c$ = the earth's universal gravitational parameter = $7.2921151467 \times 10^{-5}$ rads/sec;
  $t_K$ = time from almanac reference time = $t - t_{oa}$; and
  $t_{oa}$ = almanac reference time.

2. Next, the earth fixed coordinates are calculated.

$$x_K = x_K' \cos(\Omega_K) - y_K' \cos(i_K)\sin(\Omega_K)$$

$$y_K = x_K' \sin(\Omega_K) + y_K' \cos(i_K)\cos(\Omega_K)$$

$$z_K = y_K' \sin(i_K)$$

where
  $i_K = i_o$ = inclination.

If the selected satellite is neither geosynchronous or geostationary as in Box 64, the orbital plane position of the given satellite is calculated by the following formulas, which take into consideration the gravitational effects of the sun and moon. This is done using calculations known in the art. Once the orbital plane position of the nongeosynchronous and nongeostationary satellite has been determined, the orbital plane coordinates are transformed into earth fixed coordinates in the same manner as described in conjunction with Box 66. After the earth fixed coordinates for the given satellite are ascertained, the satellite location algorithm determines whether all the satellite positions have been calculated for a chosen constellation, as indicated by Box 70. If not, the algorithm repeats Boxes 62–68. The algorithm proceeds in this iterative series to identify the satellite in the selected constellation with a satellite position most suited for the user's particular needs.

If all the satellite positions have been calculated for the chosen satellite constellation, the satellite location algorithm then determines whether the user is using a future planning routine by referencing the inputs entered as the initial step of the algorithm, as shown by Box 72. If the user is engaging in a current planning routine, the algorithm references the user location and time using the GPS system, as indicated by Box 74. The user's current location and time is determined by performing the attitude determining system ("ADS") algorithm, as is disclosed fully in applicant's co-pending application Ser. No. 08/077,734. This algorithm uses GPS carrier phased interferometry for attitude determination. In general, the ADS algorithm includes two stages of processing. The first stage executes data validation procedures to check the integrity of the data, including the receiver operating status, the GPS satellite tracking parameters, the GPS satellite constellation, the GPS satellite position, the differential carrier phase at each antenna, and doppler information. The procedures initialize and update the processing status and computation of variables and determine whether the position and carrier phase data are valid for attitude processing. This first stage also checks the stability of the differential phase measurement. At the end of this stage, flags are issued to indicate the validity of the data that is needed to initiate attitude determination procedures.

The second stage of the ADS algorithm performs the actual attitude determination. Briefly, the first step in this second stage of the ADS algorithm consists of a satellite selection process provided for determining which GPS satellites, from among all satellites visible at a given time, will be used in the ADS algorithm. The ADS can, at any time, receive information from up to ten GPS satellites. The ADS algorithm selects the four best satellite signals available. The ADS algorithm then compiles data collected from the receivers, and other sources of information, such as the input/output information and the information received by an inclinometer, and computes the attitude of the antenna ground plane.

Figure 4:
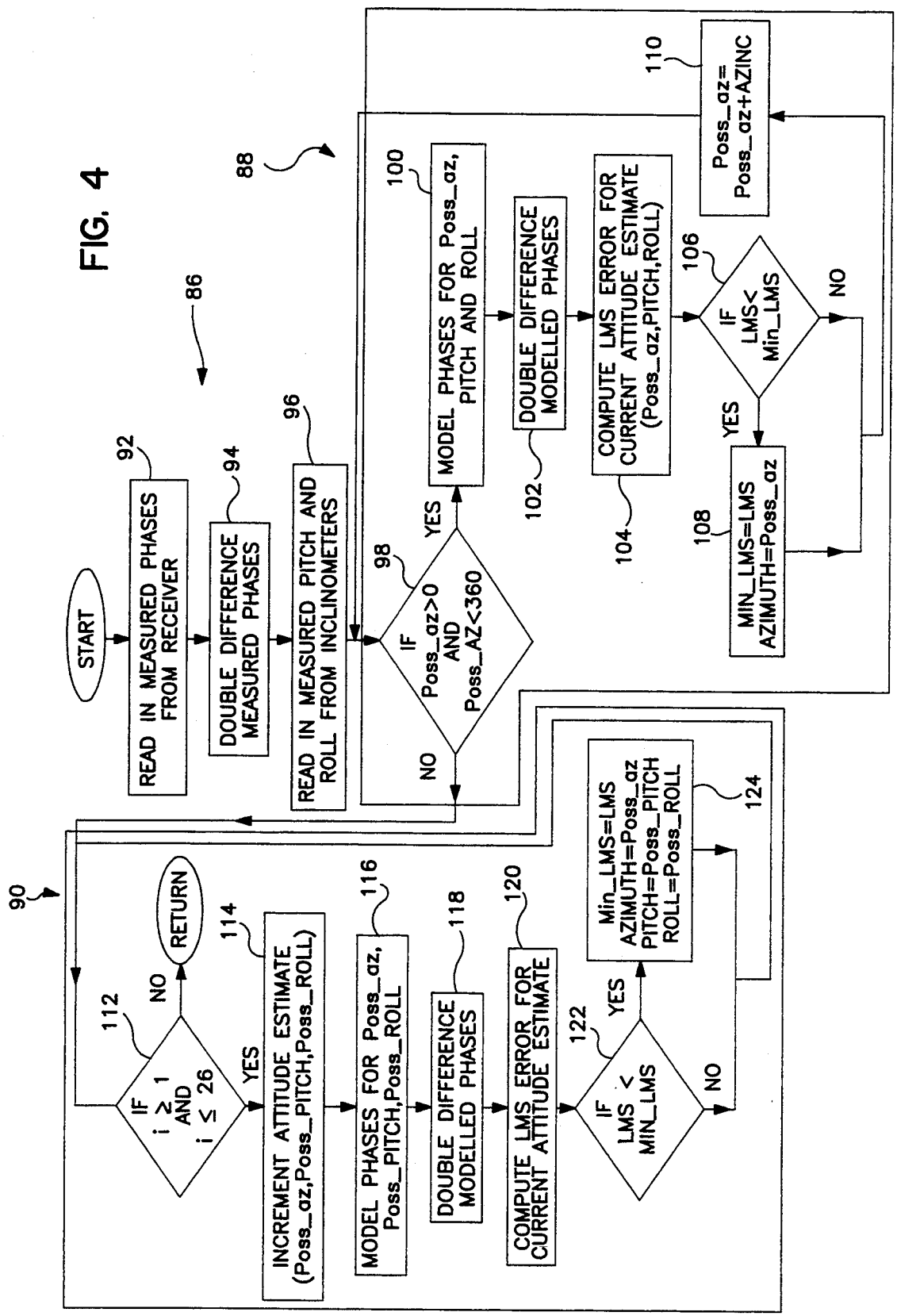
FIG. 4 is a flow diagram illustrating the attitude determining algorithm.

Turning to FIG. 4, a flow diagram is shown illustrating the ADS algorithm. The algorithm consists of three main components, namely a satellite constellation selection process 86, comprising steps 92-96, a coarse search 88 comprising steps 98-110, and a fine search 90 comprising steps 112-124. The ADS algorithm is preferably embedded in central processing unit 20 of FIG. 1. In general, both the coarse and fine searches select a number of search attitude estimates, and then model a single differenced phase measurement for each attitude estimate. Each search has a designated methodology as to how each trial attitude is selected. The errors between the modeled and measured phases are calculated for each estimate, and the attitude estimate with the minimum error is considered the attitude solution.

Prior to calculating attitude, other algorithms must first select the best satellite constellation—the four GPS satellites from which telemetry reception is best—from among the entire constellation of GPS satellites available at any given time. So, prior to the start of the coarse search, central processing unit 20 reads measured phases of the carrier waves emitted from orbiting GPS satellites from receivers 16 and 18 of FIG. 1, as indicated by Box 92. More specifically, the phase is first measured at each receiver 16 and 18. Those measurements are first single differenced and then double differenced. Single differencing refers to taking the difference in the phases of the carrier waves between two antennas along an antenna baseline. Single differencing the phase measurements removes satellite clock errors, some level of multipath errors, and errors caused by selective availability. Those single differenced results are then differenced again between different satellite pairs, yielding a double differenced set of phases as indicated by Box 94. Double differencing removes errors such as receiver clock errors, electrical path length errors, and non-synchronous receiver errors. If inclinometers are being used, the central processing unit 20 reads data relating to pitch and roll from the inclinometers, as shown by block 78.

An example of single differencing is as follows and relates to the equilateral triangle antenna configuration, as illustrated in FIG. 2b, and associated receivers:

Assuming baseline 46 consists of Receiver A (Antenna 38) and Receiver B (Antenna 40);

Assuming baseline 48 consists of Receiver A (Antenna 38) and Receiver C (Antenna 36);

Assuming baseline 50 consists of Receiver B (Antenna 40) and Receiver C (Antenna 36);

$$\alpha_i 1 = \phi_{iA} - \phi_{iB}$$

$$\alpha_i 2 = \phi_{iA} - \phi_{iC}$$

$$\alpha_i 3 = \phi_{iB} - \phi_{iC}$$

where $i = 1$ to N, and N is the number of satellites, and $\phi_{ix}$ = Phase measurements from satellite "i" at Receiver X, where $X = A$, B, or C.

The single differencing measurement is then:

$$\phi = \begin{bmatrix} \alpha_{i1} & \alpha_{i2} & \alpha_{i3} \\ . & . & . \\ . & . & . \\ . & . & . \\ \alpha_{N1} & \alpha_{N2} & \alpha_{N3} \end{bmatrix}$$

Double differencing, therefore, involves using the same calculations for multiple baselines as follows:

$$\Theta = \begin{bmatrix} \beta_{11} & \beta_{12} & \beta_{1M} \\ . & & . \\ . & & . \\ . & & . \\ \beta_{D1} & . & . & . & \beta_{DM} \end{bmatrix}$$

where $D = (N^2 - N)/2$; $j = 1$ to M; M is the number of baselines; and $$\beta_{1j} = \alpha_{1j} - \alpha_{2j}$$
$$\beta_{2j} = \alpha_{1j} - \alpha_{3j}$$
$$\beta_{3j} = \alpha_{1j} - \alpha_{4j}$$
$$\beta_{4j} = \alpha_{2j} - \alpha_{3j}$$
$$\beta_{5j} = \alpha_{2j} - \alpha_{4j}$$
$$\beta_{6j} = \alpha_{3j} - \alpha_{4j}$$
$$.$$
$$\beta_{mj}$$

Thereafter, the ADS algorithm calculates a gross estimate of the attitude measurement, accurate to within about 10-50 degrees, and preferably 20-30 degrees. Using double differencing of carrier phase measurements from among the three antenna baselines, attitude is determined to within ±0.5 degrees.

Figure 5:
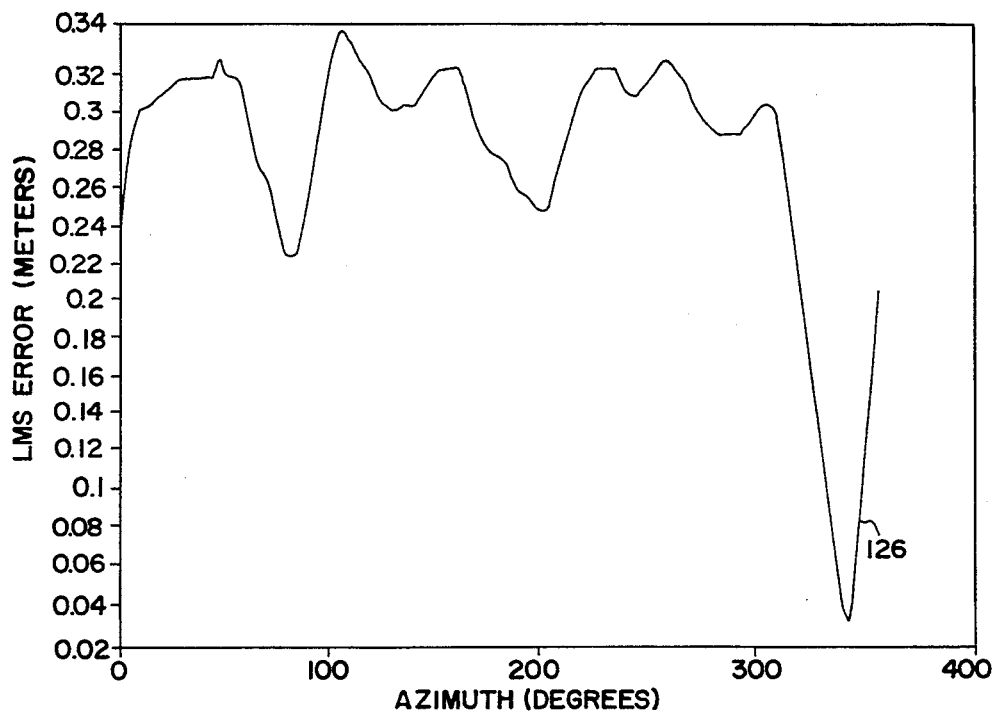
FIGS. 5 is a graph of Azimuth versus LMS error and illustrates the method by which the algorithm of FIG. 3 determines attitude, where azimuth is plotted on the abscissa, and LMS error is plotted on the ordinate.

The ADS algorithm then proceeds to coarse search 88. The purpose of coarse search 88 is to get a gross estimate of the attitude, with as few calculations as possible. More specifically, the coarse search 88 models phases at selected attitude estimates to determine the rough attitude of the antenna array. The estimates are selected in an incremental fashion about a solution space. It is preferable to limit the solution space using information such as a previous attitude solution or measurements. The coarse search 88 provides an estimate of the accuracy of the modeled phases for each of the trial attitude estimates by calculating the least root squared ("LMC") error. The LMS errors are calculated by comparing the measured and modeled double differenced phases. When the LMS error is at a minimum, the trial attitude estimate is considered the attitude solution. Calculation of the attitude estimate may be illustrated by FIG. 5. FIG. 5 shows an x-y coordinate graph where azimuth is plotted on the abscissa, and the least root squared ("LMC") error is plotted on the ordinate for an antenna pointed at 345° and oriented at 0° pitch and 0° roll. The course search provides an approximate azimuth somewhere along the global minimum of curve 126. The lowest point on curve 126 represents the estimate whose modeled phases are closest to the measured phases and, thus, represents a gross estimate of the attitude.

The larger the antenna separation, the more complex the LMS solution becomes. For long antenna baselines, false minimums occur at other than the correct solution. Shortening the baseline to less than a carrier wavelength eliminates most false minimums. In the embodiment having three antennas arranged in a triangular formation, the need for spacing the antennas less than a wavelength apart is removed. With three baselines, there is enough redundant information to eliminate false minimums. Three baselines attenuate false minimums and accentuate the true solution. Also, the triangular baseline arrangement yields a better accuracy for any given baseline length. This occurs because of redundant measurements and because all satellites are in a good geometrical relationship to at least one of the antenna baselines.

Turning back to FIG. 4, the specific steps of the coarse search 88 will now be described. The first step, as indicated Box 98, limits the search range for possible attitudes in the coarse search 88. In one example, Box 98, would limit the search range from:

$$0° \geq \text{azimuth} < 360°$$

$$0° \geq \text{pitch} \leq 1°$$

$$0° \geq \text{roll} \geq 1°.$$

Box 100 models these single differenced phases for the attitude estimate. The next step, as indicated in Box 102, performs double differencing calculations for the modeled phases. Next, Box 104 computes the LMS error for the attitude estimates. The modeled phases are then compared to the measured phases. Boxes 106 and 108 compare the calculated error for each of the attitude estimates, and if the current estimate has the least error—in other words, the modeled phase is most like the measured phases—it is kept for the current "best estimate". Box 110 then adds an increment to the current estimate, so that the next estimate goes through the steps in Boxes 80-86. If this estimate has a lower error than all of the previous ones, it then becomes the "best estimate". Once all of the estimates in the solution space have been tried, the algorithm passes to the fine search 90.

The purpose of the fine search, generally indicated 90, is to accurately determine attitude/azimuth to 0.5° or greater accuracy. The iterations in the fine search calculate the global minimum of curve 126 of FIG. 5. In the example in FIG. 5, the fine search would calculate a minimum of 345°, starting from a course search estimate of 350°. The fine search also models phases at selected attitude estimates, but the way in which the estimates are selected differs in the fine search. The search tries a number of the closest attitude estimates to the current "best estimate" to model. For example, if the current "best estimate" were (350°, 0.5°, 0.5°) (azimuth, pitch, roll), and the interval size was 2°, then 26 estimates would be shown as follows:

TABLE I 26 trials for 1 increment of the Fine Search assumes current "best estimate" is (350°, 0.5°, 0.5°), and search interval is 2°.

| | | |
|---|---|---|
| (350°, −0.91°, 1.91°) | (350°, 0.5°, 2.5°) | (35°, 1.91°, 1.91°) |
| (350°, −1.5°, 0.5°) | (350°, 0.5°, 0.5°) | (350°, 2.5°, 0.5°) |
| (350°, −0.91°, −0.91°) | (350°, 0.5°, −1.5°) | (350°, 1.91°, −0.91°) |
| (348°, −0.91°, 1.91°) | (348°, 0.5°, 2.5°) | (348°, 1.91°, 1.91°) |
| (348°, −1.5°, 0.5°) | (348°, 0.5°, 0.5°) | (348°, 2.5°, 0.5°) |
| (348°, −0.91°, −0.91°) | (348°, 0.5°, −1.5°) | (348°, 1.91°, −0.91°) |
| (352°, −0.91°, 1.91°) | (352°, 0.5°, 2.5°) | (352°, 1.91°, 1.91°) |
| (352°, −1.5°, 0.5°) | (352°, 0.5°, 0.5°) | (352°, 2.5°, 0.5°) |
| (352°, −0.91°, −0.91°) | (352°, 0.5°, −1.5°) | (352°, 1.91°, −0.91°) |

The size of the increment utilized in the fine search is dependent on the size of the error. The object is to minimize the number of iterations of the search, so the interval size depends on how close the estimates are to the final solution. For example, a larger error would require a larger interval between the estimates, and, as the search spirals in on the solution, the interval gets progressively smaller. Phase modeling, as in Boxes 114 and 116 of fine search 90, is then conducted as follows:

Sample Calculation for Phase Modeling

Given an attitude estimate $(\hat{AZ}, \hat{EL}, \hat{RL})$, compute $\hat{AZ}$ and EL for each baseline as follows:
1. Calculate a local pointing vector.

$$x_i = \cos(\hat{AZ}_i)\cos(\hat{EL}_i)\bar{o} + \sin(\hat{AZ}_i)\cos(\hat{EL}_i)j + \sin(\hat{EL}_i)k$$

where i=1 to M and M=the number of baselines

2. Transform the vector measurements into global earth-centered, earth-fixed ("ECEF") coordinates.

$$X_i = x_i LR^T$$

where $x_i = 3 \times 1$ matrix, which is the local pointing vector of baseline "i"; $X_i = 3 \times 1$ matrix, which is the ECEF vector of baseline "i"; LR=$3 \times 3$ matrix, which is the transformation matrix from local to ECEF coordinates; i=1 to M; and M=the number of baselines.

3. Multiply $X_i$ by the receiver to satellite vectors (R) to get the single differenced phrase divided by the carrier phase wavelength ($\lambda = 0.1902$ m).

$$R X_i = \frac{1}{80} \Theta_i$$

where R=(N×3) matrix of Rx to satellite vectors and N=the number of satellites, and $\Theta_i$=the $i^{th}$ column of the $\Theta$ matrix and i=1 to M and M=the number of baselines.

Thereafter, the ADS algorithm computes for error, as illustrated in Box 120 of fine search 90, as follows:

$$\text{LMS error} = \sqrt{\sum_{i=1}^{D} \sum_{j=1}^{M} (\beta ij - \hat{\beta} ij)^2}$$

where $\beta ij$ is the $i^{th}$ row, $j^{th}$ column element of the $\Theta$ matrix derived from the measured phases, and $\hat{\beta} ij$, is the ith row, jth column element of the $\Theta$ matrix derived from the modelled phases from the given attitude estimate $(\hat{AZ}, \hat{EL}, \hat{RL})$.

Turning to the specific steps of the fine search 90, Box 112 in the search 90 serves as a counter to ensure that all of the estimates closest to the current "best estimate" are tried. Box 114 then increments the "best estimate" according to the index of the counter to determine the value of the current estimate to be modeled and tried. Next, the single differenced phases for the attitude estimates are modeled as shown by Box 116. Box 118 indicates the next step which involves performing the double difference calculations for the modeled phases single differenced in Box 116. Once this calculation is performed, the error for the attitude estimates is calculated, as indicated by Box 120. The modeled phases are compared to the measured phases. As indicated by Box 122, the calculated error for each of the attitude estimates is compared, and if the current estimate has the least error (modeled phases most like the measured phases) it is kept for the current "best estimate". The "best estimate" calculations are indicated in Box 124. After the "best estimate" of the trials is determined, the process goes through a second iteration, until the next "best estimate" is found. This process continues until no other "best estimates" are obtained after going through an entire iteration. Box 106 stores the current best estimates.

In this manner, the ADS algorithm illustrated in FIG. 4 compares information received from the receivers to determine the attitude of the system. When activated, the algorithm continuously repeats these calculations to yield constantly updated attitude information.

Information collected by the antenna array from the orbiting GPS satellites must be assimilated and corrected for errors. In addition to reducing errors from phase measurements, the ADS algorithm is further adapted to eliminate or reduce errors due to fixed and drifting electrical path links to the antenna. The algorithm also contains an antenna differential phase error ("ADPE") correction table to reduce errors due to phase center migration. ADPE is caused by the GPS signals electromagnetic interaction with the antennas and baseline assembly. This interaction affects the gain pattern of the antenna and determines the phase center migration pattern. Correction of ADPE provides faster solution convergence and allows selection of satellites at lower elevations. Lower elevation satellites provide better constellation geometry. This, in turn, allows more satellites to be used as part of the attitude solution. To correct ADPEs, each baseline is calibrated on an antenna range to determine the expected phase error for satellites at every elevation and azimuth. These errors are arranged in a table of correction factors that are implemented by the ADS algorithm.

In addition, the accuracy of the attitude depends heavily on the selected satellite constellation. If the best constellation can be chosen for each measurement, the attitude accuracy improves. Moreover, selecting a constellation exclusively for attitude calculations yields a more accurate result than using satellites selected for position calculations.

Thus, the satellite location algorithm makes use of the ADS algorithm to calculate the system user's location and time using the GPS system. If, on the other hand, the planning routine is a future planning routine, the satellite location algorithm proceeds to Box 82, where the user is prompted to enter the user location and time via keypad 28.

Once the location and orientation of the system user has been determined, the system then calculates the azimuth and elevation to an earth-orbiting satellite, such as a communications satellite. The satellite location and pointing system includes an algorithm designed to perform these calculations using (i) the position and time data retrieved from either the GPS receiver or the key pad and (ii) satellite ephemeris data stored in the central processing unit's memory 34. The algorithm determines the azimuth and elevation of the selected satellite visibility window relative to the system user's location and time, as shown by Box 76. This algorithm determines a differential azimuth and elevation between the desired pointing vector to the selected earth-orbiting satellite and the current pointing vector. These calculations may be performed by using the following equations:

Elevation Determination

Elevation$=r_o \sin(\delta)/[1+(r_e/r_o)^2-2(r_e/r_o)\cos\delta)^{\frac{1}{2}}]$ $\delta = \cos^{-1}[\cos(L_e)\cos(L_s)\cos(L_s-L_e)+\sin(L_e 0 - \sin(L_s)]$ where $r_e$=radius of the earth=6370 km; $L_s$=North latitude subsatellite point; $L_e$=North latitude user; $e_s$=West longitude subsatellite point; and $l_e$=West longitude user; and $L_s = 90° - \cos^{-1}[z_K/(x_K^2+y_K^2+z_K^2)^{\frac{1}{2}}]$ so that $L_s = -\tan^{-1}(y_K/x_K)$ for $y_K \geq 0$ and $x_K \geq 0$
$L_s = 180° + \tan^{-1}(y_K/|x_K|)$ for $y_K \geq 0$ and $x_K \leq 0$
$L_s = 90° + \tan^{-1}(|x_K/y_K|)$ for $y_K \leq 0$ and $x_K \geq 0$
$L_K = \tan^{-1}(|y_K|/x_K)$ for $y_K \leq 0$ and $x_K \geq 0$.

Azimuth Determination $L_A$ and $L_B$=North latitude of user and subsatellite point, respectively;

$l_A$ and $l_B$=West longitude of user and subsatellite point, respectively; and $C = |L_A - L_B|$ or $|360 - |L_A - L_B||$ degrees, whichever makes $C \leq 180$ degrees.

If one point is in the Northern Hemisphere, label the point closest to the north pole B, so $L_B > L_A$ and calculate:

$\tan[0.5(y-x)] = \cot(0.5C)\sin[0.5(L_B - L_A)]/\cos[0.5(L_B - L_A)]$ $\tan[0.5(y+x)] = \cot(0.5C)\sin[0.5(L_B - L_A)]/\sin[0.5(L_B + L_A)]$ $x = 0.5(y+x) + 0.5(y-x)$ $y = 0.5(y+x) - 0.5(y-x)$.

If both points are in the Southern Hemisphere, label the point closest to the south pole as B, so $L_B < L_A$ or $|L_B| > |L_A|$ and calculate:

$\tan[0.5(y-x)] = \cot(0.5C)\sin[0.5(|L_A| - |L_B|)]/\cos[0.5(|L_B| + |L_A|)]$ $\tan[0.5(y+x)] = \cot(0.5C)\sin[0.5(|L_B| - |L_A|)]/\sin[0.5(|L_B| + |L_A|)]$ $x = 0.5(y+x) + 0.5(y-x)$ $y = 0.5(y+x) - 0.5(y-x)$.

From these calculations, it can be seen that the relationship between the x, y, and the azimuth depends on the identity of points A and B and on their geographical relationship, as follows:

TABLE 2

| Subsatellite Point | Earth Station | Relation | Azimuth in Degrees |
|---|---|---|---|
| At Least One Point in the Northern Hemisphere | | | |
| A | B | A west of B | 360 − y |
| B | A | A west of B | X |
| A | B | B west of A | y |
| B | A | B west of A | 360 − X |
| Both Points in the Southern Hemisphere | | | |
| A | B | A west of B | 180 + y |
| B | A | A west of B | 180 − X |
| A | B | B west of A | 180 − y |

TABLE 2-continued

| Subsatellite Point | Earth Station | Relation | Azimuth in Degrees |
|---|---|---|---|
| B | A | B west of A | 180 + X |

After calculating the azimuth and elevation, the algorithm then again determines whether the routine is a current routine or a future routine, as shown by Box 78, and outputs data corresponding to either the current planning routine or the future planning routine, shown by Boxes 80 and 84, respectively. Display device 26 visually displays to the system user the pointing angle, or elevation and azimuth, to the desired satellite in a menu form. Alternatively, the user may view a tracking display on display device 26 which shows the user's current position relative to the desired satellite's orbital path, as will be described in conjunction with FIG. 6a.

The satellite location algorithm is flexible enough to accommodate special case orbits, both prograde—where the satellite orbits the earth in the same direction as the earth's rotation—and retrograde—where the satellite orbits the earth in a direction counter to the earth's rotation. The algorithm also accommodates polar, equatorial, geosynchronous and geostationary orbits. The eccentricity of these orbits may vary from circular to highly eccentric, which resembles an elongated ellipsoid. The algorithm also includes a perturbation model which takes into account, for example, the gravitational pull of the earth and the sun, to provide a more accurate method of satellite position determination.

In addition to providing algorithms to calculate both the position of the system user—the ADS algorithm—and the pointing angle to an orbiting satellite—the satellite location algorithm—, the location and pointing system includes various user-interface display screens, accessible on display device 26.

In order to facilitate easy use of the satellite locating and positioning system described hereinabove, a series of screens are presented by the system in order to prompt the user to properly use the system. This "menu driven" series of user prompts asks a series of questions to which the user must respond. In responding to these questions, the system either asks additional questions, or provides graphic and/or alpha numeric information with respect to location of the selected satellite. The user prompts and displayed information will depend on whether or not the user desires to employ his current location and time information, or future location and time information. Thus, the first user prompt asks the user to identify whether or not current or future user location and time information will be used.

EXAMPLE I

Current Information

Figure 6A:
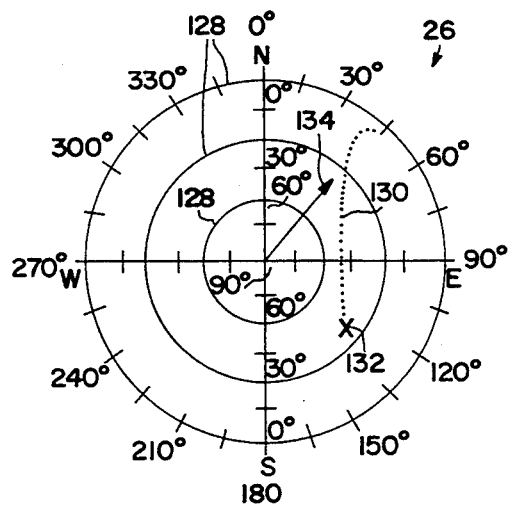
FIG. 6a is a schematic illustrating a visual display of a satellite's location, elevation, and azimuth with reference to the system user's current location, the current pointing angle of the satellite location and pointing system, and the satellite's orbital path for use in a current planning embodiment in accordance with the invention.

When the user selects his current time and location information for purposes of calculating the position and pointing angle to a particular satellite, the satellite locating and pointing system will provide a series of prompts and information adapted to assist the user in identifying and locating the satellite. The first prompt relates to selection of the satellite constellation of interest to the user. For example, the display 26 will display a menu of satellite constellations for which almanac data is available such as, for example, the Fleet Satellite Communications System (FLTSATCOM); the Air Force Satellite Communications System (AFSAT); the Defense Satellite Communications System (DSCS); the Military Satellite Communications System (Milstar); and the International Maritime Satellite Communications System (Inmersat). The user will then be requested to select which satellite constellation he chooses to identify. On making his selection, the system calculates information as described above, and provides the user with a visual guide, as illustrated in FIG. 6a. Specifically, the visual guide consists of a plurality of concentric rings 128 wherein compass points are identified along various points of the concentric rings. Each concentric ring relates to, for example, degrees up from the horizon. Plotted on the display, in, for example, hash marks, is the flight path of the chosen satellite 130, the exact location of which is identified by a mark, such as, for example, an "X" 132. The visual guide, as shown in FIG. 6a, includes an arrow 134 pointing in the direction of the system user's orientation. The length of arrow 134 may vary based on the system's elevation. The user may place the tip of the display arrow on the "X" marking the selected satellite to attain the desired pointing angle to the satellite.

In addition to displaying the visual guide, the satellite locating and pointing system will also provide information relating to locating and tracking the selected satellite. For example, a subsequent user prompt will include information relating to the period of time in which the satellite window of viewing is available, specifying the start and end times, of the window; the azimuth and elevation of the selected satellite; and the optimal time of viewing. The information will also include information relating to user longitude, latitude, and altitude. To take into account real world obstructions, such as tree limbs, the subsequent user prompt allows the user to input mask angles. Employing this information, along with the visual guide, allows the user to accurately ascertain the location and position of the selected satellite.

EXAMPLE II

Future Information

Alternatively, a user can select a program wherein a future set of coordinates relating to location and time is desired for purposes of identifying and locating a selected satellite. After selecting a future location and time, the system will prompt the user to select the desired satellite constellation as described hereinabove with respect to Example I. Thereafter, the system will prompt the user to answer a series of questions with respect to future time and location information. For example, the user will be asked to identify the day, month, and year for which the user wishes information to be assembled. Thereafter the user will be requested to identify the time in both local and Greenwich Mean Time hours, as well as the duration of time during which communication is desired. Longitude and latitude information is also requested, and must be specified in, for example, degrees, minutes, and seconds. The altitude of the user is also necessary in order to determine the correct pointing angle. After each of these prompts have been answered by the user, the system will supply a visual guide, as illustrated in FIG. 6b, and a locating menu such as those described hereinabove with respect to Example I, except that the arrow indicating the system user's current orientation is absent from the visual guide.

In addition, a user may update the satellite location and pointing system by entering almanac data describing the motion of a particular satellite constellation. Once input, this data will provide the satellite location and position system with information necessary to track a satellite of interest in the satellite constellation.

Figure 6B:
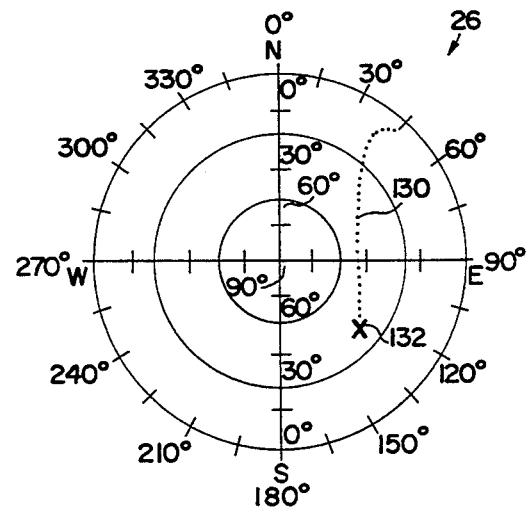
FIG. 6b is a schematic illustrating a visual display of a satellite's location, elevation, and azimuth with reference to a system user's future location and time, and the satellite's orbital path, for use in a future planning embodiment in accordance with the invention.

Such visual cues, as shown in FIGS. 6a and 6b, may be enhanced with an auditory cue. Audio indicator 30 may emit a suppressible tone which increases in volume or frequency as the system is pointed closer to the selected satellite's location and decreases as the system points away from the satellite.

The subject invention has potential applications in both military and commercial markets. In the military, the hand-held satellite location and pointing system has applications beyond interacting with stationary communications dishes. The integrated position, time, and attitude system in a portable unit makes the subject invention ideal for scout and special forces missions. This portable device may also be used for remotely-piloted vehicle ("RPV") navigation, personal navigation, and target location and designation. In addition, the subject invention may be used for precision munitions delivery. In addition, a vector to a target, determined relative to a GPS derived position and attitude, can be transmitted to a weapon or an attacker that also determines its position by GPS. The subject satellite location and position system, integrated with a laser range finder, could be used in such an application as the target designator.

In the commercial market, the portable device may be used for various navigation applications. The attitude features would improve camera pointing and photogrammetry, as well as positioning and surveying. In addition, the satellite location and position system may also be used for aligning commercial satellite dishes.

In describing the invention, references have been made to a preferred embodiment and an illustrative advantages of the invention. Those skilled in the art, however, and familiar with the instant disclosure of the subject invention, will recognize additions, deletions, modifications, substitutions, and other changes which will fall within purview of the subject invention and claims.

We claim:

1. A system for determining the location of and pointing angle to a selected one of a first series of orbiting satellites by receiving telemetry and other electronic signals provided by a second series of orbiting satellites, calculating the location of said system from said telemetry and other electronic signals, and calculating the location and pointing angle of said selected one of said first series of orbiting satellites relative to the location of said system, said system comprising:

antenna array means comprising at least two discrete antenna, said antenna array adapted to receive the telemetry and electronic signals transmitted by the second series of orbiting satellites;

receiver means electronically communicating with each of said discrete antenna and adapted to interpret the telemetry and electronic signals collected by said antenna array means and to generate receiver output signals;

algorithmic means for locating said selected one of said first series of orbiting satellites and calculating the location of and pointing angle to said selected one of said first series of orbiting satellites; and microprocessor means for receiving said receiver output signals and for processing said receiver output signals with said algorithmic means to determine the location of and pointing angle to said selected one of said first series of orbiting satellites.

2. A system as defined in claim 1, wherein said algorithmic means calculates the azimuth and elevation of said system and the azimuth and the elevation of said selected one of said first series of orbiting satellites.

3. A system as defined in claim 1, further comprising input means for receiving input by a user, said input means electronically transmitting the input information to said microprocessor means to alter the parameters of said algorithmic means, said input means electrically communicating with said microprocessor means.

4. A system as defined in claim 1, further comprising display means for visually displaying information to a user of said system.

5. A system as defined in claim 4, wherein said information displayed by said display means corresponding to the azimuth and elevation of said system and the azimuth and elevation of said selected one of said first series of orbiting satellites.

6. A system as defined in claim 1, further comprising means for establishing the orientation of said system, said orientation establishing means electrically communicating with said microprocessor means, said algorithmic means comparing information received from said receiver means and said orientation establishing means to determine the orientation of said system.

7. A system as defined in claim 6, wherein said orientation establishing means comprises an inclinometer for measuring the elevation angle of said system, said inclinometer electrically communicating with said microprocessor means.

8. A system as defined in claim 1, wherein said antenna array means comprises three antenna arranged in a generally triangular configuration on an antenna platform, each of said antennae forming a baseline with another of said antennae.

9. A system as defined in claim 8, wherein the length of each said baseline being less than the wavelength of the telemetry and electronic signals provided from said second series of orbiting satellites.

10. A system as defined in claim 1, wherein said antenna array means comprises two antennas, defining a baseline extending between said two antennas.

11. A system as defined in claim 1, wherein said antenna array means and a baseplane upon which said antenna array means is mounted form a pointing plane.

12. A system as defined in claim 1, further comprising auditory information means for providing audio information related to system location.

13. A system as defined in claim 1, wherein said microprocessor means further comprises memory means for storing satellite ephemeris data entered into said microprocessor means through said input means.

14. A system as defined in claim 1, further comprising algorithmic comparing means for selecting one or more preferred satellites from among said second series of orbiting satellites to determine the attitude and orientation of said system.

15. A method of determining the location of and pointing angle to one of a first series of earth orbiting satellites, said method comprising the steps of:

providing means adapted to collect and receive telemetry and other electronic signals from one or more satellites of a second series of earth orbiting satellites, said collecting and receiving means comprising at least two antennas, each of said antenna electrically communicating with a receiver;

providing an algorithm embedded in a microprocessor, said algorithm employing carrier phase interferometry to interpret said received telemetry and electronic signals to calculate the location and attitude of said system and then from the system location and attitude information to calculate the location of and pointing angle to the selected one of said first series of earth-orbiting satellites;

relaying information received by each said antenna and each said receiver to said microprocessor for calculation of the location of and pointing angle to the selected one of said first series of earth-orbiting satellites by said algorithm; and displaying system location information and information relating to said selected earth orbiting satellites.

16. A method as defined in claim 15, further comprising the step of providing a visual and audio display of the current position of the selected satellite.

17. A method as defined in claim 15, including the further step of calculating elevation and attitude information by employing double differenced carrier phase interferometry.

18. A method as in claim 15, including the further step of providing at least three antennas arranged in an equilateral triangle.

19. A method as in claim 15, including the further step of calculating said location and attitude information by first establishing a coarse measurement of elevation and attitude, with accuracy between about $+/-30°$, and subsequently establishing a second, fine measurement of attitude and location improving the accuracy of said first determination to within about $+/-0.5°$.

20. A method as in claim 16, wherein said visual information is displayed on a touch sensitive liquid crystal display.

21. A method as in claim 15, including the further step of arranging said three antenna in an equilateral triangle, said antenna mounted upon a base plane and forming a pointing plane.

22. A method as in claim 15, including the further step of calculating the location and pointing angle to each satellite within the said series of satellites.

23. A method as in claim 22, wherein said algorithm selects the best available satellite from said second series of satellites, said selection based upon, at least, satellite visibility and signal quality.

24. A method as in claim 15, wherein said algorithm is further adapted to reduce errors inherent in said telemetry.

25. A method as in claim 15, comprising the further step of plotting location and pointing angle to a selected satellite with respect to a position remote from said system.

* * * * *